(12) United States Patent
Atanasyan et al.

(10) Patent No.: US 6,374,807 B1
(45) Date of Patent: Apr. 23, 2002

(54) METHOD FOR DETERMINING THE PRESSURE PREVAILING IN A FUEL INJECTION RAMP OF AN INTERNAL COMBUSTION ENGINE AND CORRESPONDING DEVICE

(75) Inventors: Alain Atanasyan, Pibrac; Jean-Paul Ferrie, Cugnaux, both of (FR)

(73) Assignee: Siemens Automotive S.A., Toulouse (FR)

( * ) Notice: Subject to any disclaimer, the term of this patent is extended or adjusted under 35 U.S.C. 154(b) by 0 days.

(21) Appl. No.: 09/914,394

(22) PCT Filed: Mar. 10, 2000

(86) PCT No.: PCT/EP00/02147

§ 371 Date: Aug. 28, 2001

§ 102(e) Date: Aug. 28, 2001

(87) PCT Pub. No.: WO00/55486

PCT Pub. Date: Sep. 21, 2000

(30) Foreign Application Priority Data

Mar. 12, 1999 (FR) .............................. 99 03084

(51) Int. Cl.$^7$ .............................................. F02M 41/00
(52) U.S. Cl. ...................................... 123/456; 123/494
(58) Field of Search ................................. 123/456, 447, 123/494, 514, 506; 73/119 A

(56) References Cited

U.S. PATENT DOCUMENTS

| 5,771,861 A | * | 6/1998 | Musser et al. | 123/357 |
| 5,834,624 A | | 11/1998 | Nakagawa | |
| 5,988,142 A | * | 11/1999 | Klopfer | 123/446 |
| 6,085,727 A | * | 7/2000 | Nakano | 123/447 |
| 6,088,647 A | * | 7/2000 | Hemberger et al. | 701/104 |
| 6,102,000 A | * | 8/2000 | Shindoh et al. | 123/381 |

FOREIGN PATENT DOCUMENTS

EP 0 777 942 6/1997

* cited by examiner

*Primary Examiner*—Carl S. Miller
(74) *Attorney, Agent, or Firm*—Young & Thompson

(57) ABSTRACT

A process for determining the pressure prevailing in a fuel injection manifold of an internal combustion engine includes supplying the feeding pump (11) with fuel such that the injection manifold will be supplied with fuel at the feeding pressure, measuring the pressure prevailing in the injection manifold (14) with the pressure sensor (18) when the fuel is at the feeding pressure, deducing therefrom the percentage of error (e) of the pressure sensor, and memorizing this error, establishing a law of linear decrease of this error, between the feeding pressure and the lower limit of the range of maximum precision of the sensor, and deducing therefrom, for each value of pressure measured by the sensor between the feeding pressure and the lower pressure limit, the real value of the pressure of the fuel in the injection manifold, to correct the quantity of injected fuel.

5 Claims, 1 Drawing Sheet

Figure 1:
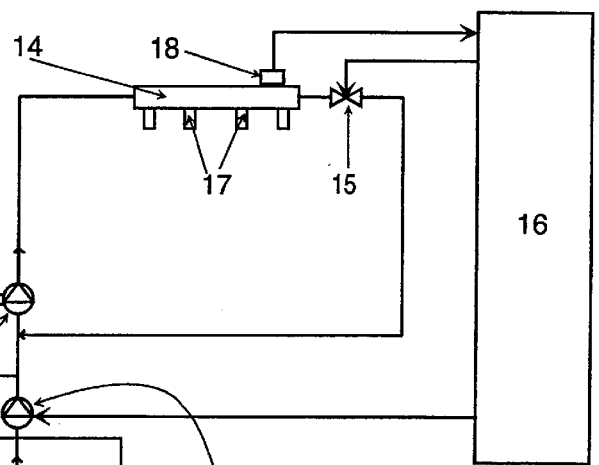

METHOD FOR DETERMINING THE PRESSURE PREVAILING IN A FUEL INJECTION RAMP OF AN INTERNAL COMBUSTION ENGINE AND CORRESPONDING DEVICE

The present invention relates to a process for the determination of the pressure prevailing in a fuel injection manifold of an internal combustion engine and a corresponding device.

More particularly, it relates to evaluating the fuel pressure when the pressure sensor works under boundary conditions, particularly at startup.

It is already known to measure the pressure prevailing in the fuel injection manifold of an internal combustion engine. To this end, a pressure sensor is emplaced in this injection manifold.

In an engine with conventional indirect injection, this injection pressure is relatively low, of the order of 3 to 5 bars. On the other hand, in the case of an engine with direct injection, this pressure is high and generally varies from 30 to 120 bars. Of course, pressure sensors specifically adapted to measure high pressures are used. At these high pressures, these sensors generally have a precision of the order of ±3%, which is sufficient to control correctly the quantity of fuel to be injected into the cylinder of the engine.

However, during startup, the injection manifold is not immediately supplied with fuel at a pressure of 30 to 120 bars. Thus, these pressures are achieved by the mechanical pump driven by the engine and are not reached until the pump has a speed of rotation of the order of 200 to 300 rpm. This speed of rotation is not reached immediately upon startup. Thus, between the startup phase of the engine (0 rpm) and the pressurized phase (200 to 300 rpm), the pressure in the injection manifold varies and increases progressively as a function of the speed of rotation of the vehicle motor.

To assist startup of the vehicle, it is known to use a feeding pump whose object is to supply the engine with fuel having a pressure of at least 3 to 5 bars during startup. This feeding pump improves the startup of the engine but does not permit the pressure sensor to operate with high precision during startup. Thus, the pressure sensor is not capable of indicating the real pressure in the injection manifold when the latter varies from 3 to 30 bars. This sensor is designed to work with high precision between 30 and 120 bars, but at low pressure, it has considerable errors of the order of ±200%. It is thus impossible to rely on the values of pressure indicated by the sensor when the pressure is below 30 bars. However, as the regulation of the pressure in the pressure manifold is carried out by electronic control of the leakage of a proportional regulator which is itself in a loop with the measurement given by the pressure sensor, if the measurement of the sensor is erroneous and the opening time of the injectors is corrected as a function of the supply pressure so as to control the maximum flow rate thereof, the regulation of the fuel pressure is impossible. The same is true for controlling the quality of the startup.

Moreover, it is not possible to establish a typical law of development of the pressure prevailing in a given fuel supply system during the startup phase, because the latter varies as a function of the development of the engine speed and is never the same.

The fact of not being able to determine with precision the development of the fuel pressure during startup, gives rise to numerous drawbacks, namely more or less long startups, variations in the performance of startup, stalling after startup . . . etc.

The object of the present invention is to overcome all of these drawbacks and particularly to evaluate the development of the fuel pressure during startup of an engine with direct injection.

To this end, the present invention relates to a process for determining the pressure prevailing in a fuel injection manifold of an internal combustion engine, said motor being particularly provided with:

a pressure sensor mounted in the injection manifold, said sensor being adapted to operate with maximum precision between a lower limit and an upper limit of pressure, a pump for pressurizing the fuel, a feeding pump supplying the circuit with fuel at a feeding pressure below the lower limit of the range of maximum precision of the sensor, and a pressure regulator, said process being characterized in that it consists in:

a—supplying the feeding pump with fuel, such that the injection manifold will be supplied with fuel at the feeding pressure, b—measuring the pressure prevailing in the injection manifold with the pressure sensor, when the fuel is at the feeding pressure, c—deducing the percentage of error of the pressure sensor, and memorizing this error, d—establishing a law of linear decrease of this error between the feeding pressure and the lower limit of the range of maximum precision of the sensor and e—deducing for each value of pressure measured by the sensor between the feeding pressure and the lower pressure limit, the real value of the pressure of the fuel in the injection manifold, to correct the quantity of injected fuel.

Thus, knowledge of the measuring error of the sensor at the feeding pressure permits evaluating the real pressure in the injection manifold when this pressure is comprised between the feeding pressure and the lower limit of the range of precision of the sensor. Thus, the linearization of this error, between the feeding pressure and the lower limit of pressure, permits establishing the law for computing the real pressure (law of correction of the measurement of the sensor) between the two pressure values. Thus, the measurements carried out by the sensor beyond its maximum precision zone are nevertheless usable, after application of the correction law determined by linearization.

Preferably, such a process of evaluation of the pressure can be used at the startup of the vehicle and/or the stopping of this latter. Thus, for example, the error value determined at startup can be confirmed at stopping.

Similarly, the law of correction of the measurement of the sensor can be determined during initial driving. At each further stop, it then suffices to verify that the error of measurement at the feeding pressure is always the same. In this case, it is not necessary to repeat the measurement of this error at each startup.

Figure 2:
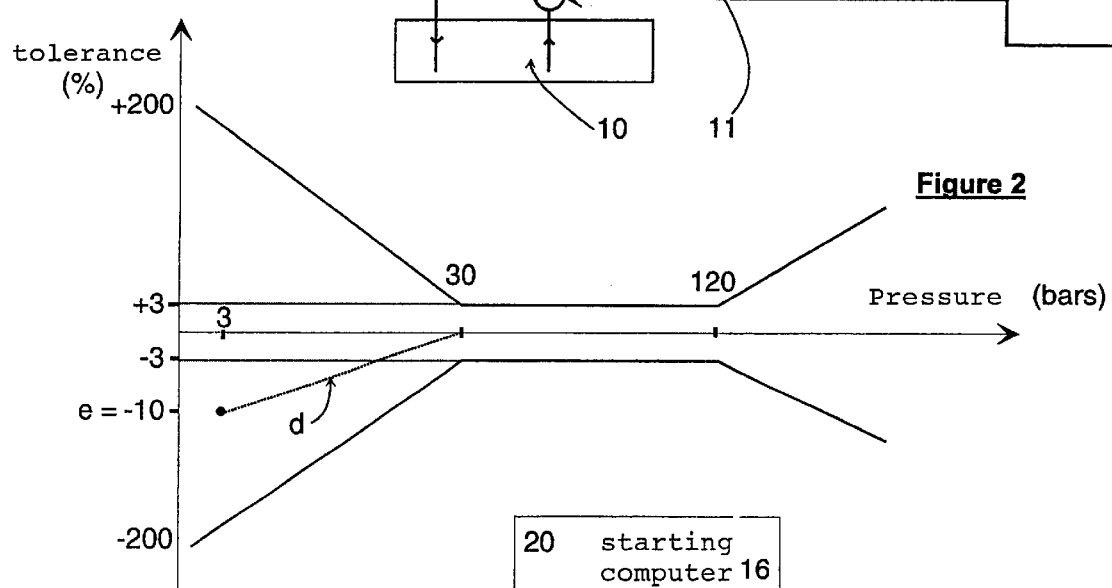
Figure 3:
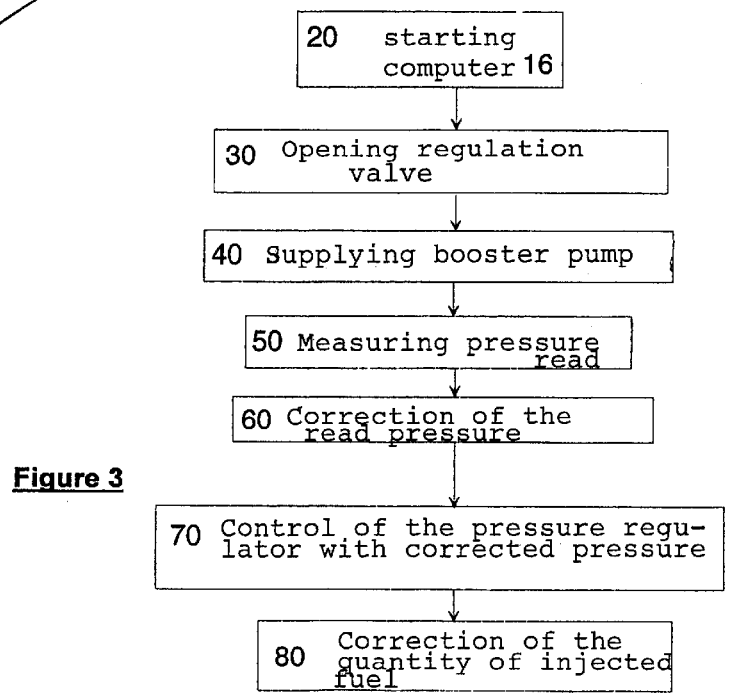

Other objects, characteristics and advantages of the present invention will become apparent from the description which follows, by way of non-limiting example, and with reference to the accompanying drawings, in which:

FIG. 1 is a schematic view showing the fuel supply device of an injection manifold, FIG. 2 is a schematic view of the extent of uncertainty of a pressure sensor, and FIG. 3 is a schematic view showing the different steps of the process according to the invention.

There will first of all be recalled, with reference to FIG. 1, the construction of a fuel supply system of an internal combustion engine.

A tank 10 contains the fuel that is to supply the engine. This fuel is drawn by a feeding pump 11. This pump is associated with a feeding regulator 12 which maintains the pressure at the outlet of the pump at a value of 3 bars (for example). Thus, the feeding pump conventionally used maintain the fuel at a pressure fixed between 3 and 5 bars.

The excess fuel is returned to the tank by the feeding regulator 12.

The fuel is then sucked in by a mechanical pump 13 to be pressurized. This pump ensures a pressure of 30 to 120 bars in the supply circuit of the injection manifold when it is driven by the engine at a sufficient speed (of the order of 200 to 300 rpm). At the output of this pump, fuel is sent to the injection manifold 14. An injection regulator 15 maintains the pressure in the manifold at the desired value (30 to 120 bars for example) according to the condition of operation of the engine. Excess fuel is returned upstream of the pump 13 and downstream of the feeding pump 11.

A central motor control unit 16 controls the operation of the feeding pump and of the regulator 15 and controls the injectors 17 as a function of the measurements carried out by a pressure sensor 18 located in the injection manifold.

This injection sensor (FIG. 2) is adapted to measure the pressure between 30 and 120 bars (for example) with high precision (for example less than 3% error). On the contrary, when the pressure to be measured is below the lower limit of precision (30 bars in the case illustrated), the precision of its measurement is inaccurate. This imprecision can even be of the order of ±200%.

The problem sought to be solved by the invention is explained hereafter.

At startup of the engine, the pressure within the injection manifold varies from the feeding pressure (3 bars) to the lower limit of precision (30 bars). However, the sensor used does not give reliable measurements over this pressure range. Moreover, the measurements of the pressure sensor must be taken into account because it is with the help of these that control of the injectors is carried out.

As shown in FIG. 2, the range of precision of a pressure sensor is generally from 30 bars to 120 bars.

According to the invention, the solution consists in measuring the value of the pressure prevailing in the injection manifold when this pressure is equal to the feeding pressure. In the present case, this feeding pressure is of the order of 3 bars. The pressure measured by the pressure sensor is then compared to the known feeding pressure.

It is to be noted that for a given system, the feeding pressure is fixed and known.

This comparison permits establishing the percentage of error (e) of the sensor in question. For example, in FIG. 2, this percentage is 10%.

There is then carried out a linearization of the error, between the feeding pressure and the lower limit of the range of precision. In the present case, the error is 10% at 3 bars and the linearization consists in saying that it will be 0% at 30 bars (lower limit of the range of precision of the sensor).

This having been done, there is defined a curve d (in broken lines in FIG. 2) giving the percentage of error as a function of the measurement of the sensor. It suffices to correct the pressure values measured by the sensor with the help of this correction curve, to determine the real value of the pressure.

The establishment of the correction law for the sensor is carried out in the following manner (FIG. 3).

First (step 20), the central unit 16 is started as soon as the contact key is placed in the contact lock. The pressure regulator 15 of the system is maintained fully open (step 30) and the feeding pump 11 is immediately supplied (step 40). The value given by the pressure sensor 18 is then read (step 50). This value must be equal to the feeding pressure. The error percentage of the sensor (the absolute value of the difference between the value measured by the sensor and the feeding pressure divided by the value read) is called (e). The law of correction of the measurement is established (step 60) by linearizing the percentage of error for a pressure varying from the feeding pressure to the lower pressure limit. The control of the pressure regulator 15 is then carried out based on the corrected pressure (step 70). The correction of the quantity of fuel to be injected (step 80) is then carried out based on the corrected pressure determined in step 70. Thus the computer for controlling the engine sends to each cylinder the necessary quantity of fuel, based on the corrected fuel pressure and not on the erroneous value given by the pressure sensor 18.

Of course, when the pressure in the injection manifold reaches the value of the lower limit of the precision range (30 bars), it is no longer necessary to apply a correction to the measured value. The sensor is thus considered as accurate when the measured pressure is greater than the lower limit (30 bars).

Thus, the process according to the invention consists in determining the pressure prevailing in a fuel injection manifold of an internal combustion engine, the said engine being particularly provided with:

a pressure sensor 18 mounted in the injection manifold 14, the said sensor being adapted to operate with maximum precision between a lower limit (30 bars) and an upper limit (120 bars) of pressure, —a pump 13 for pressurizing the fuel, a feeding pump 18 supplying the circuit with fuel at a feeding pressure (3 bars) below the lower limit of the range of maximum precision of the sensor and a pressure regulator 15, said process being characterized in that it consists in:
  a—supplying the feeding pump 11 with fuel such that the injection manifold 14 will be supplied with fuel at the feeding pressure,
  b—measuring the pressure prevailing in the injection manifold 14 with the pressure sensor 18 when the fuel is at the feeding pressure,
  c—deducing the percentage of error (e) of the pressure sensor and memorizing this error,
  d—establishing a law of linear decrease of this error, between the feeding pressure and the lower limit of the range of maximum precision of the sensor, and
  e—deducing, for each value of pressure measured by the sensor between the feeding pressure and the lower pressure limit, the real value of the pressure of the fuel in the injection manifold to correct the quantity of injected fuel.

It will be noted as a modification that the process according to the invention is used at startup of the vehicle and that the percentage of error at the feeding pressure is confirmed upon stopping the vehicle, by performing a second time all of steps a to c.

As a modification, this process can be used during the first actuation of the vehicle. In this case, the error value at the feeding pressure is confirmed upon each stopping of the engine. If this value changes over the course of time, the process according to the invention can be used at the following startup so as to establish a new law of correction of the measured pressure.

The present invention also relates to a device using the process described above, namely, a device for measuring the pressure, comprising:

means 18 for measuring the pressure prevailing in the injection manifold 14, means 16 for comparing the measured pressure and the feeding pressure, adapted to determine the error (e) of measurement when the pressure in the injection manifold is the feeding pressure, means 16 for memorizing the measurement error at the feeding pressure, and means 16 for determining a law of correction of the pressure measured when the latter varies from the feeding pressure to the lower limit of pressure in the precision range of the sensor.

Of course, the present invention is not limited to the embodiments described and shown and covers any modification within the scope of those skilled in the art. Thus, this evaluation of the value of the pressure for low pressures beyond the range of precision of the sensor, can be applied to any system comprising a supply manifold (gasoline or diesel).

LIST OF REFERENCES USED

| List of references used | |
| --- | --- |
| 10 | tank |
| 11 | feeding pump |
| 12 | feeding regulator |
| 13 | mechanical pump |
| 14 | injection manifold |
| 15 | system regulator |
| 16 | central control unit |
| 17 | injector |
| 18 | pressure sensor |
| d | curve of linearization of error |
| e | percentage of error at the feeding pressure |

20 to 80 steps of the process

What is claimed is:

1. Process for determining the pressure prevailing in an injection manifold (14) of fuel for an internal combustion engine, said engine being particularly provided with:

a pressure sensor (18) mounted in the injection manifold, said sensor being adapted to operate with maximum precision between a lower limit and an upper limit of pressure, a pump (13) for pressurizing the fuel, a feeding pump (11) supplying the circuit with fuel at a feeding pressure below the lower limit of the range of maximum precision of the sensor, and a pressure regulator (15), said process being characterized in that it consists in:

(a) supplying the feeding pump (11) with fuel, such that the injection manifold is supplied with fuel at the feeding pressure, (b) measuring the pressure prevailing in the injection manifold (14) with the pressure sensor (18), when the fuel is at the feeding pressure, (c) deducing therefrom the percentage of error (e) of the pressure sensor, and memorizing this error, (d) establishing a law of linear decrease of this error, between the feeding pressure and the lower limit of the range of maximum precision of the sensor, and (e) deducing therefrom, for each value of pressure measured by the sensor between the feeding pressure and the lower pressure limit, the real value of the pressure of the fuel in the injection manifold, to correct the quantity of injected fuel.

2. Process according to claim 1, characterized in that it is used at starting up the vehicle and in that the percentage of error (e) at the feeding pressure is confirmed, upon stopping the vehicle, by applying a second time all the steps (a to c).

3. Process according to claim 1, characterized in that it is used upon each stopping of the engine.

4. Process according to claim 1, characterized in that the feeding pressure is of the order of 3 to 5 bars and the lower limit is of the order of 30 bars.

5. Device for measuring the pressure using the process according to claim 1, characterized in that it comprises:

means for measuring the pressure prevailing in the injection manifold, means for comparing the measured pressure and the feeding pressure, adapted to determine the measurement error when the pressure in the injection manifold is the feeding pressure, means for memorizing the measurement error at the feeding pressure, and means for determining a law of correction of the measured pressure when the latter varies from the feeding pressure at the lower limit of the pressure of the range of precision of the sensor.

* * * * *